Patented Sept. 12, 1950

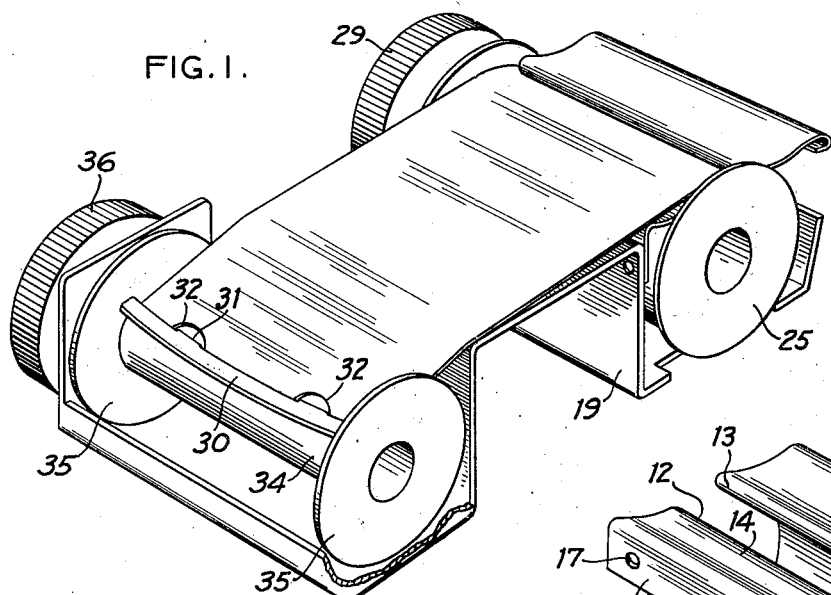
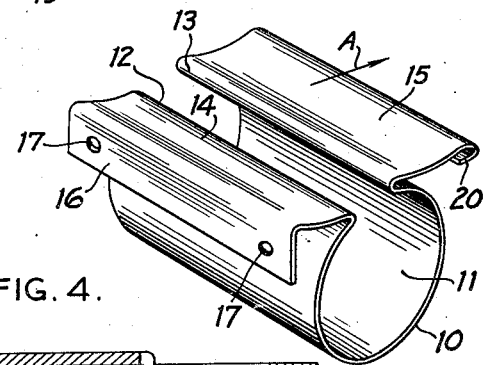
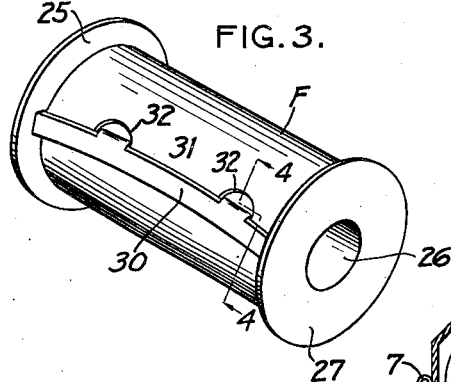

2,521,956

UNITED STATES PATENT OFFICE 2,521,956

FILM CRADLE FOR ROLL FILM CAMERAS

Roger W. Wallace and Paul J. Ernisse, Rochester, N. Y., assignors to Eastman Kodak Company, Rochester, N. Y., a corporation of New Jersey Application January 17, 1947, Serial No. 722,710

3 Claims. (Cl. 95—31)

This invention relates to photography and more particularly to roll film cameras. One object of our invention is to provide a camera which can be loaded quickly and easily. Another object of our invention is to provide a camera in which a supply roll of film can be loaded by placing the film cartridge in a film cradle which is resiliently mounted in a film chamber in a camera. A still further object of our invention is to provide a film-receiving receptacle which can be easily operated under normal conditions and one in which careful adjustment of the film spool, in order to place it in the proper position, is at least partially eliminated. Other objects will appear from the following specification, the novel features being particularly pointed out in the claims at the end thereof.

Coming now to the drawings wherein like reference characters denote like parts throughout:

Fig. 1 is a perspective view of a film-winding mechanism partially removed from a camera having a film cradle constructed in accordance with and embodying a preferred form of our invention;

Fig. 2 is a perspective view of the film cradle removed from the camera, parts shown in Fig. 1;

Fig. 3 is a typical film spool or film cartridge which may be used in our preferred form of film cradle;

Fig. 4 is an enlarged section on line 4—4 of Fig. 3;

Fig. 5 is a second embodiment of a film take-up mechanism which may be used with our invention; and Fig. 6 is a sectional view through a typical camera equipped with a spring film cradle constructed in accordance with a preferred form of our invention.

In most cameras, film is loaded into a film chamber by placing a film spool on spool-centering pins which must be pushed out, and after the film spool is placed in the spool chamber, must be pushed into apertures in the ends of the film spool. In other cases, the film spools may be supported by rollers when the camera back has been placed on the camera, but in most roll film cameras some degree of care is usually required to properly position a film spool in a camera. The axes of the spools in the take-up and supply chambers should be parallel and the film must be threaded across the exposure frame accurately with the backing paper or the end of the film accurately loaded in the take-up spool. One of the objects of our invention is to overcome at least some of these steps and to provide a camera which can be loaded without careful work on the part of the operator.

In accordance with our invention, as indicated in Fig. 6, the camera body 1 may be of a known type in which there is an exposure frame 2, a supply film chamber 3, and a take-up film chamber 4. The camera back 5 may be of the type which joins the body on a line 6 passing through the center of the camera so that the back partially encloses the bellows frame and the two spool chambers. If desired, the camera back may be hinged at 7 to the camera body and there may be a suitable latch 8 at the other end to hold the back in position.

In order to facilitate loading a fresh roll of film into the camera, we prefer to provide a flexible cradle 10 which may be shaped as shown in Fig. 2. As indicated in this view, the central part 11 of the flexible film cradle is generally cylindrical in shape and there are spaced edges 12 and 13 which normally lie adjacent, as shown, but which can be sprung apart due to the resiliency of the material of which the cradle is made. There are oppositely-extending flanges 14 and 15 from the slot edges 12 and 13, the former flange 14 having a downwardly bent portion 16 with apertures 17 through which rivets, or other fastening members, 18, may pass to hold the spring cradle in position on the camera wall 19. It will be noticed that the flange 14 is bent into a concave shape so that a film F, passing from the flexible cradle to the take-up spool chamber 4, will tend to be spaced from the flange after it is drawn around the edge 12.

The flange 15 may be folded over at 20 to form a handle so that when a film cartridge is to be loaded in place, this handle may be drawn outwardly in the position shown by the arrow A in Fig. 2. Since the flexible cradle is made of lightweight spring metal, it may be readily moved from the position shown in Fig. 2 to a position in which the film cartridge may be moved into place when the camera back 5 has been swung open.

The supply film spool may be of a type having a polygonal opening 24 in one flange 25 and having a round opening 26 in the other flange 27. The camera preferably carries a polygonal shaft 28 which may be attached to a winding knob 29, if the camera is of the type requiring rewinding of the film to the original spool after exposure. If the film is to be wound on a take-up spool, as indicated in Fig. 1, the winding knob 29 may be omitted. In the form of our invention shown in Figs. 1 and 3, the film cartridge may consist of a film spool, the film F of which has a reinforcing bar 30 attached to the end of the film, preferably in the manner shown in Fig. 4. This reinforcing strip may be a generally U-shaped piece of metal having flanges 31 bent through apertures 32 in the film F to hold the strip on the end of the film. This strip may be made slightly wider than the film F so that it may cooperate with a film-holding device on a take-up spool 34 of any desirable type, such as shown in our copending application Ser. No. 722,712, filed January 17, 1947. Since this forms no part of the present invention, it need not be herein described. The spool 34 may be provided with flanges 35 and a winding handle 36 can be used to turn the spool to wind film thereon.

As shown in our copending application and as shown in Fig. 5, instead of the spool 34 we may utilize a hub 40 having a means for readily attaching the strengthening rib 30 on the end of the film F. In Fig. 5 the hub 40 may be equipped with two ratchet wheels 41 having similar spaced teeth and, in this instance, the reinforcing bar 42 may be provided with downwardly-formed spring ends 43 which can be pressed downwardly so as to engage in the recesses 44 in the ends of the hub 40. Thus, by merely drawing out the film and snapping the attaching bar into place, the film is easily and accurately attached to the take-up hub. This attachment to the take-up hub and the detachment therefor is the subject matter of our copending application.

The present application is directed to the spring cradle into which the supply of film cartridge may be placed. The operation of loading the camera is exceedingly simple. A film cartridge can be placed in the spring cradle when the camera back is removed by pulling outwardly on the handle 15, dropping the film spool into place and sliding it a slight distance axially to engage the polygonal shaft 28. The reinforcing strip 30 is then rapidly drawn across the exposure frame 2 and attached to the take-up spool, or hub 34, or 40, as the case may be, after which the film may be wound until the exposures are made. If the construction shown in Fig. 5 is employed, after the exposures are made, the handle 29 is turned in a reverse direction to wind the film back upon the original spool or into the original film cartridge and by swinging open the back and pulling out on the handle 15, the exposed film can be easily and quickly removed.

We claim:

1. A film spool holder for use in a camera comprising a camera body, the camera body including an exposure frame, a film spool chamber at one end of the exposure frame, and a removable camera back, covering the film spool chamber at one end, the camera body and back forming a complete closure for the spool chamber and when the camera back is removed, exposing the film spool chamber for loading and unloading film, said film spool holder comprising a flexible cradle having a generally cylindrical portion for receiving a film cartridge and normally encircling said film cartridge except for a film passageway, a pair of flanges extending in opposite directions from edges adjacent each other to form said film passageway between the pair of flanges, said edges extending parallel to the cylindrical portion, one flange including means attached to the camera spool chamber and adjacent an edge of the exposure frame for holding said flange against the camera body and in a fixed position relative thereto, and the other flange extending in an opposite direction and away from the exposure frame and constituting a handle for pulling the generally cylindrical portion from its normal shape to increase the space between the flanges for loading and unloading a film spool therebetween.

2. The film spool holder for use in a camera, as defined in claim 1, characterized by the flange constituting a handle normally lying inside the enclosed film spool chamber being movable to a position out of the spool chamber by flexing the film spool holder by moving the handle away from the spool chamber.

3. The film spool holder for use in a camera, as defined in claim 1, characterized by the flange constituting a handle and the flange having means for holding said flange against the camera body and in a fixed position being tangentially positioned when in a rest position and with respect to the generally cylindrical portion of the spool holder.

ROGER W. WALLACE.
PAUL J. ERNISSE.

REFERENCES CITED

The following references are of record in the file of this patent:

UNITED STATES PATENTS

| Number | Name | Date |
|---|---|---|
| 662,762 | Brownell | Nov. 27, 1900 |
| 725,034 | Brownell | Apr. 14, 1903 |
| 804,501 | Prather et al. | Nov. 14, 1905 |
| 923,255 | Flemister | June 1, 1909 |
| 1,560,615 | Speidel | Nov. 10, 1925 |

FOREIGN PATENTS

| Number | Country | Date |
|---|---|---|
| 329,907 | France | Aug. 8, 1903 |
| 19,208 | Austria | Feb. 10, 1905 |
| 605,278 | Germany | Nov. 19, 1932 |